United States Patent [19]
Frantz

[11] 3,927,553
[45] Dec. 23, 1975

[54] TESTING FITTING FOR PRESSURE-RESPONSIVE DEVICES

[76] Inventor: Lanier Frantz, 972 Stonegate Drive, Salem, Va. 24153

[22] Filed: Oct. 18, 1973

[21] Appl. No.: 407,488

[52] U.S. Cl. .............................. 73/4 R; 137/625.68
[51] Int. Cl.² .................... G01L 27/00; F16K 11/20
[58] Field of Search ................. 73/4 R; 137/625.68

[56] References Cited
UNITED STATES PATENTS

| | | | |
|---|---|---|---|
| 2,958,219 | 11/1960 | McIntyre | 73/4 R |
| 3,049,148 | 8/1962 | Richardson | 73/4 R X |
| 3,280,834 | 10/1966 | Zahuranec | 73/4 R UX |
| 3,557,602 | 1/1971 | Frantz | 73/4 R |
| 3,817,282 | 6/1974 | Peters | 73/4 R X |

Primary Examiner—Richard C. Queisser
Assistant Examiner—Frederick Shoon
Attorney, Agent, or Firm—Wilmer Mechlin

[57] ABSTRACT

A fitting for a pressure switch or other pressure-responsive device for periodically testing the device. The fitting has a normally plugged testing port for receiving a testing probe and is valved and otherwise ported for alternately connecting the device to the pressure line and testing port and automatically connecting the device to the pressure line except during testing.

4 Claims, 2 Drawing Figures

TESTING FITTING FOR PRESSURE-RESPONSIVE DEVICES

BACKGROUND OF THE INVENTION

Fittings heretofore proposed for both the mounting and periodic testing of pressure-responsive devices have been ported and valved for alternate connection of such a device to a pressure line and to a testing probe temporarily inserted in a normally plugged testing port. As in Morgan U.S. Pat. No. 3,077,761 and Frantz U.S. Pat. No. 3,601,142, the practice has been to use as the valving in a testing fitting, a spring-pressed valve element or shuttle seatable by its spring for disconnecting the pressure-responsive device from the pressure line during testing and displaced from its seat to reconnect the device to the pressure line by reinsertion of the plug normally closing the testing port on completion of a testing operation. The testing fittings of both Morgan and Frantz thus are dependent for the normal operation of a pressure-responsive device mounted thereon, on the presence of the testing port plug and if, due to carelessness or otherwise, the plug is not reinserted, cannot operatively connect the device to the pressure line.

The above problem is relatively minor in test fittings for gauges, since a no-pressure reading on the gauge after it supposedly has been reconnected to the pressure line will visually indicate that the testing port plug has not been reinserted. However, the problem becomes acute when testing pressure-responsive or actuated control devices, such as pressure switches, which also require periodic testing, but which themselves do not visually indicate any response to pressure and, instead, are responsible for the performance of some function by a usually remote operating device controlled thereby.

The concern of the present invention is a testing fitting which by automatically reconnecting a pressure-responsive device mounted thereon to a pressure line not only eliminates the acute problem experienced with prior testing fittings in attempting to test pressure switches and other pressure-responsive control devices, but is suitable for use with any pressure-responsive device designed for normal connection to a pressure line.

SUMMARY OF THE INVENTION

An object of the present invention is to provide a testing fitting for pressure-responsive devices so ported and valved as alternately to connect a pressure-responsive device mounted thereon to a pressure line and a testing probe inserted in a normally plugged testing port and automatically reconnect the device to the pressure line on completion of a testing operation without dependence on replugging of the testing port.

Another object of the invention is to provide an improved testing fitting suited for mounting and testing any pressure-responsive device and dependent on the action of a testing probe on a spring-pressed valve element for alternately connecting the device to the probe during a testing operation.

Other objects and features of the invention will appear hereinafter in the detailed description, be particularly pointed out in the appended claims and be illustrated in the accompanying drawings, in which:

FIGURE DESCRIPTION

FIG. 1 is a vertical sectional view of a preferred embodiment of the testing fitting of the present invention showing the fitting mounting a pressure switch and with its valving in normal position for connecting the switch to a pressure line; and FIG. 2 is a vertical sectional view similar to FIG. 1 but showing the testing fitting in testing condition with its valve displaced from its seat by a testing probe replacing the testing port plug of the first figure.

DETAILED DESCRIPTION

Figure 1:
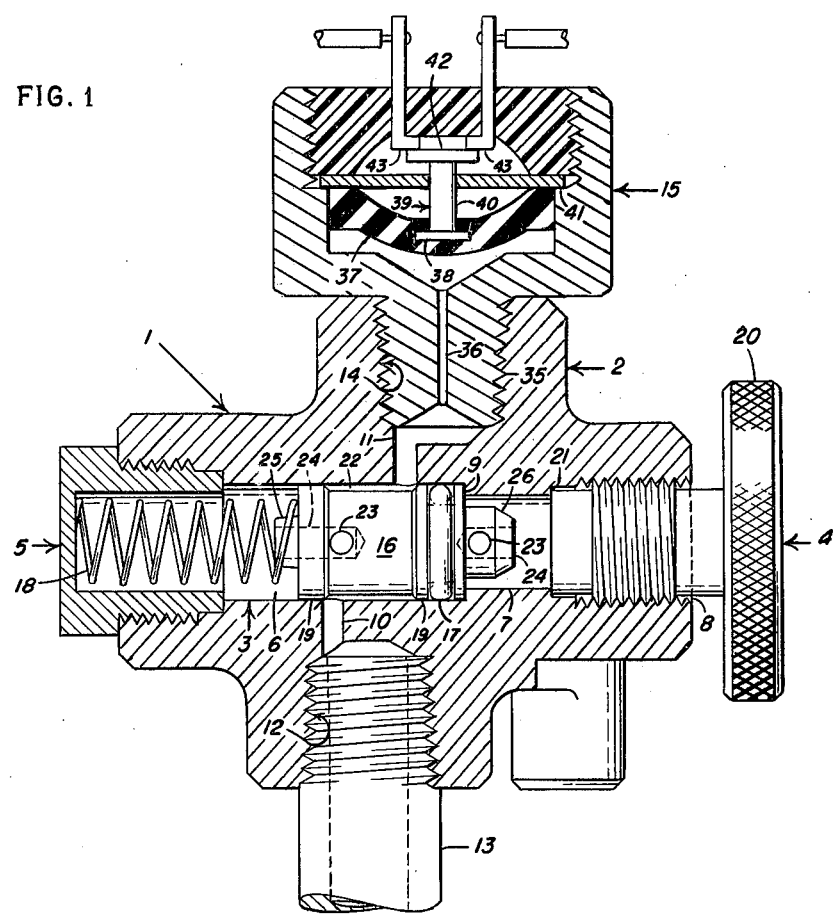
Figure 2:
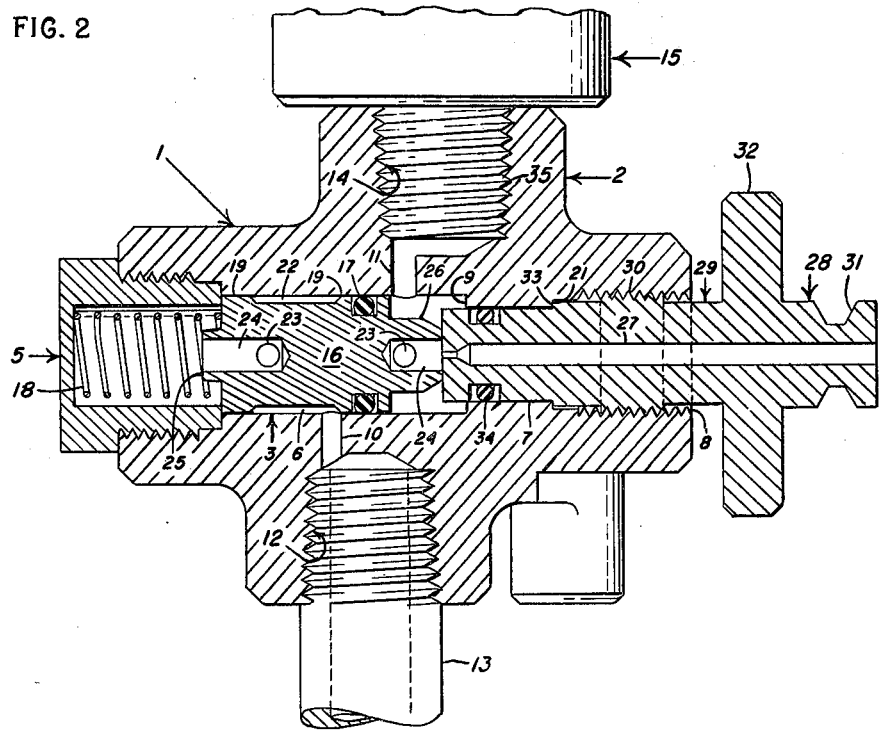

Referring now in detail to the drawings in which like reference characters designate like parts, the improved testing fitting of the present invention is designed for enabling pressure-responsive devices to be tested in place without removal from their mountings, by a suitable pressure tester such as shown in Frantz U.S. Pat. No. 3,557,602. The improved fitting is adapted for use in mounting and testing any device responsive or sensitive to or actuated by air or other fluid pressure and, like the fitting of Frantz U.S. Pat. No. 3,601,142, thus is usable for pressure gauges. However, as will be hereinafter explained, the improved fitting is most critically needed for use with pressure switches and like pressure-responsive control devices and it is therefore with such a switch that the fitting has been illustrated as exemplary of the invention.

In the illustrated preferred embodiment, the testing fitting, designated as 1, has a body 2 and an aperture or opening 3 extending longitudinally or from front to back through the body. Threaded over its opposite end portions for normally threadedly receiving at the front a plug 4 and closing at the back by a preferably hollow and inwardly opening threaded cap 5, the aperture 3 therebetween is smooth-walled and divided axially into a cylindrical valve chamber or rearward portion 6 and a concentric cylindrical intermediate bore, passage or forward portion 7 opening forwardly onto the front of the body through a testing or plug port 8 formed by the aperture's threaded front end portion. The intermediate bore 7 conveniently is of less diameter than the valve chamber 6 to provide at the front end of the latter an instanding annular stop or shoulder 9.

In the body 2 of the fitting 1 are an inlet port 10 and outlet port 11 communicating with and opening onto the valve chamber 6 at axially spaced positions or points respectively remote from and adjacent to the annular stop 9. Relatively staggered or offset, the inlet and outlet ports 10 and 11 project or extend preferably radially from the valve chamber 6 and connect or communicate the chamber respectively with a pair of spaced seats or sockets, one an inlet seat 12 suitably internally threaded for threadedly receiving or seating an end of an air or fluid pressure line 13, and the other a seat 14 for a pressure-responsive device 15.

Connectable across the valve chamber 6 to the inlet port 10 and through the front end of that chamber and the intermediate bore 7 to the testing port 8, the outlet port 11 is positioned axially of the chamber between and spaced from the chamber's front end and the inlet port, and alternately connectable to the inlet and testing ports by a valve member, shuttle or piston 16 in the valve chamber. Shiftable, reciprocable or slidable axially or longitudinally between the inner end of the cap 5 and the annular stop 9 at opposite ends of the valve chamber 6, the preferred shuttle, for alternately connecting the outlet port 11 to one and simultaneously disconnecting it from the other of the inlet and testing ports 10 and 8, has, mounts or carries a single sealing head on its front end portion suitably in the form of an O-ring or similar annular gasket 17.

The shuttle 16 normally is yieldably held in the front portion of the valve chamber 6, with its front end against the stop 9 and the O-ring 17 positioned and sealing between the stop and the outlet port, conveniently by a coil spring 18 in the cap 5 and acting therebetween and the shuttle's adjoining or confronting rear end. For testing the pressure-responsive device 15, the shuttle is shifted against the force of the spring 18 to its alternate or testing position in the rear portion of the valve chamber and in process the O-ring 17 is shifted rearwardly across the outlet port 11 to a position between that port and the inlet port 10. Although having only one sealing head, the preferred shuttle is spool-shaped, with a rim 19 on each end portion slidably engaging the side of the valve chamber 6 for guiding the shuttle's reciprocable movement and the front rim a double rim for mounting the O-ring 17.

Conveniently fitted with a knurled knob or handle 20 for easy application and removal, the plug 4 normally closing the testing port 8 against entry of foreign matter is short-stemmed and on insertion stopped short of engagement or contact with the shuttle 16 by a forwardly facing annular stop 21 at the juncture of the testing port and intermediate bore 7. Thus not disturbable by the plug 4, the shuttle 16, in either the presence or the absence of the plug, remains in its normal position in the front portion of the valve chamber 6 in which its O-ring head 17 is interposed between and disconnects the outlet and testing ports.

In the above normal position of the shuttle 16, the end rims 19 axially span or bracket the outlet and inlet ports 11 and 10 and an annular recess 22 around the shuttle between the rims provides the normal communication between the inlet and outlet ports. Interconnected radial and axial drillings 23 and 24, respectively, the former opening onto the recess 22 and the latter extending rearwardly therefrom past the rear rim and through a spring-positioning stud 25 projecting from the rear end of the shuttle, prevent the preferred sliding contact of the rear rim with the side of the valve chamber from obstructing free passage of line air or other fluid at all times past the rim. Like drillings in a concentric annular boss 26 projecting from the front end of the shuttle serve during testing to fluid-connect the outlet port 11 to the axial bore 27 of a testing probe 28 replacing the plug 4 in the testing port 8.

Similar to the testing probe of Frantz U.S. Pat. No. 3,601,142 and similarly adapted for use in a testing system such as disclosed in Frantz U.S. Pat. No. 3,557,602, the testing probe 28 has a stem 29 of coupling configuration on its outer end portion for a quick-coupling connection to a suitable tester (not shown). Threaded inwardly of that end portion for threaded insertion into the testing port 8, the stem 29 has or mounts between its threaded and end or coupling portions 30 and 31 a knurled turning knob or handle 32. Limited, fixed or predetermined in maximum projection or penetration into the aperture 3 by the engagement of an annular shoulder 33 at the inner end of the threaded portion 30 with the stop 21 in the aperture, the stem inwardly of that stop is of a reduced cross-section fittable or receivable in the intermediate bore 7 and a length to project through that bore into the valve chamber 6, so as, by engaging the confronting end of the annular boss 26, to unseat or shift the shuttle 16 rearwardly from its normal position to its alternate or testing position. With the O-ring 17 then positioned to block communication of the inlet and outlet ports 10 and 11, communication between the outlet port and the testing port or, more precisely, the axial bore 27 of the testing probe, is established through the cross drillings 23 and 24 in the boss 26. An O-ring 34 on the reduced inner end portion of the stem 29, by sealingly engaging the side of the intermediate bore 7, prevents the air or other fluid used for testing from leaking past the probe through the testing port in the probe's testing position.

Remaining in inserted position during testing of the pressure-responsive device 15, the testing probe 28 on completion of a testing operation, is unthreaded or unscrewed to retract or withdraw it from the testing port and in process enable the shuttle 16 to be returned or restored automatically to normal position either by the spring 18 and in addition to or in place of the spring, by line pressure applied from the inlet port 10 to the back of the shuttle through the drillings 23 and 24 therein. When the testing probe is removed, the testing port should be closed by the plug 4 until the next testing of the pressure-responsive device 15. However, with the shuttle automatically restored or returned to normal position by the spring 18 or line pressure and shifted from that position only under the counterforce applied through the testing probe on insertion of the latter into the testing port, even if the plug is carelessly or unintentionally left out of the testing port, the automatic action of the shuttle will ensure that the outlet port is connected to the inlet port except during testing.

As suitable as the testing fitting of Frantz U.S. Pat. No. 3,601,142 for pressure gauges, the present fitting 1 is far more suitable for a pressure switch or like fluid pressure-actuated device which itself does not indicate directly whether it is connected to line pressure, in ensuring that the device will be automatically so connected on removal of the testing probe 28. As exemplifying this use to which the fitting 1 is peculiarly adapted, the pressure-responsive device 15 therefore has been illustrated as a pressure switch.

Generally typical of pressure switches, the illustrated switch 15 has an externally threaded base or nipple 35 suitably threaded into the seat 14 and an inlet passage 36 in and extending through the nipple and opening upwardly onto the underside of a peripheral fixed or clamped rubber or like diaphragm 37 centrally engaging and suitably having embedded therein a lower head 38 of a double-headed switch member 39. As illustrated, the switch member 39 has a stem 40 fixed to the lower head 38 and extending upwardly therefrom through a suitably apertured rigid guide plate 41. An upper head or switch plate 42 fixed to the stem 40 above the guide plate 41, confronts and on being upwardly projected by fluid pressure on the underside of the diaphragm 37, bridges or connects a pair of insulatedly mounted spaced contacts 43, thus closing an electrical circuit (not otherwise shown) and actuating or energizing an electrical device (not shown) connected in the circuit at some point removed or remote from the switch. Conversely, when the fluid pressure on the diaphragm is released, as usually happens during testing, the resilience either of the diaphragm itself or of separate means opposing the action of the fluid pressure on the switch member 39, disengages the switch plate 42 from the contacts 43 and breaks or interrupts the electrical circuit.

From the above detailed description it will be apparent that there has been provided an improved testing fitting so valved as to ensure that any fluid-responsive device with which the fitting is used will be connected or exposed to line pressure except on insertion of a testing probe for a testing operation and will automatically be reconnected to line pressure when the probe is removed. It should be understood that the described and disclosed embodiment is merely exemplary of the invention and that all modifications are intended to be included that do not depart from the spirit of the invention and the scope of the appended claims.

Having described my invention, I claim:

1. A testing fitting for a pressure-responsive device, comprising a body having an aperture and a testing port in an outer end of said aperture, plug means and testing means alternately insertable in said testing port for respectively closing said port and admitting testing pressure therethrough, a pressure chamber in said aperture inwardly of and connectable through an outer end to said testing port, inlet and outlet ports opening at axially spaced positions onto said pressure chamber respectively remote from and adjacent said outer end thereof and connecting respectively to a pressure line and said pressure-responsive device, valve means in and shiftable longitudinally of said chamber between outer and inner positions for alternately connecting said outlet port respectively to said inlet and testing ports, yieldable means acting on and normally holding said valve means in said outer position, said testing means on insertion in said testing port acting directly on said valve means to exert a force in opposition to the force of said yieldable means and independently of said testing pressure for shifting said valve means to said inner position to admit said testing pressure to said pressure-responsive device, said valve means on removal of said testing means shifting to said outer position under force of said yieldable means, and said plug means being insertable in said testing port without disturbing said valve means from said outer position.

2. A testing fitting according to claim 1, wherein said pressure-responsive device is a pressure switch connected to said fitting and open to said outlet port.

3. A testing fitting according to claim 1, wherein the valve means is a shuttle having for alternately connecting the outlet port to the inlet and testing ports a single O-ring on an outer portion thereof, said O-ring sealingly engaging a side of said chamber and shifting between positions therein on opposite sides of said outlet port.

4. A testing fitting according to claim 3, wherein rim means on opposite end portions of said shuttle and slidably engaging a side of said chamber guide said shuttle during said shifting, and the shuttle in the normal position thereof fluid-connects the inlet and outlet ports through an annular recess around the shuttle between said rim means.

* * * * *